_United States Patent_ [19]

Anderson

[11] 4,201,739
[45] May 6, 1980

[54] MANUFACTURE OF METAL HALIDE PARTICLES

[76] Inventor: Scott Anderson, P.O. Box 2680, Champaign, Ill. 61820

[21] Appl. No.: 667,581

[22] Filed: Mar. 17, 1976

[51] Int. Cl.$^2$ .............................................. B01J 2/04
[52] U.S. Cl. .......................................... 264/13; 264/5
[58] Field of Search .................................. 264/13, 82

[56] References Cited

U.S. PATENT DOCUMENTS

| | | | |
|---|---|---|---|
| 3,676,534 | 7/1972 | Anderson | 264/9 |
| 3,944,639 | 3/1976 | Osajima et al. | 264/13 |

_Primary Examiner_—Donald J. Arnold
_Assistant Examiner_—James R. Hall
_Attorney, Agent, or Firm_—L. Lawton Rogers, III

[57] ABSTRACT

An improvement is disclosed in a process for the manufacture of metal halide particles containing at least one lanthanide metal halide in which the metal halide is melted and passed through a discharge conduit into an inert, quenching atmosphere. The improvement comprises adding a minor amount of hydrogen halide (the halide radical of the lanthanide metal halide and of the hydrogen halide being of the same halogen species) to the molten lanthanide metal halide to promote wetting of the molten lanthanide metal salt on the discharge conduit. The resulting particles show excellent uniformity of particle size and size distribution.

19 Claims, 1 Drawing Figure

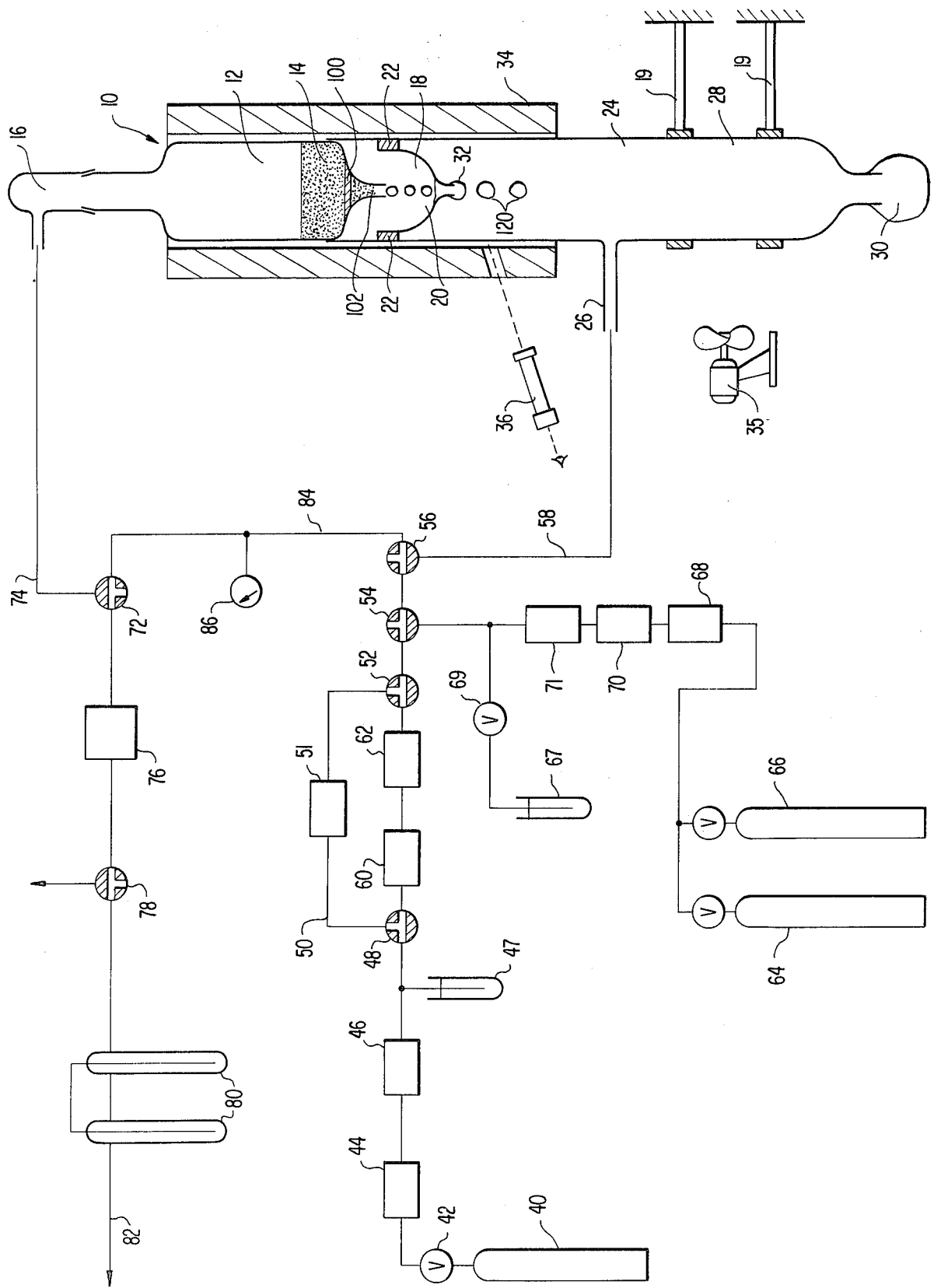

MANUFACTURE OF METAL HALIDE PARTICLES

BACKGROUND OF THE INVENTION

In recent years, there has been increasing interest in metal halide lamps, i.e., electric discharge devices which emit color-modified light and contain various metal halides as additives. The useful life of these lamps may range from 6,000 to over 10,000 hours, and the efficiency, measured in lumens of light per watt, of metal halide lamps in many instances is greater than 100.

In the preparation of these lamps, additive metal halides have been pulverized or powdered, and then pelleted in a desired mass or weight for machine feeding to the arc tube or envelope of the lamp. These metal halides, however, have contained impurities such as water and various hydroxides. Flaming, i.e., heating with a hand torch, has been used to drive off the water, but this procedure does not normally remove the hydroxide impurities, and has a further disadvantage in that other volatile material, desirably left in the lamp, is also driven off with the water.

The presence of hydrogen and oxygen in any form within the lamp envelope is detrimental to the lamp. These detriments may exist not only as free hydrogen and oxygen, but also so compounds thereof such as water, hydroxides, sulfates and silicates. The oxygen present within the envelope of the lamp oxidizes the metals such as tungsten which make up the lamp electrodes or filaments, and the resulting metal oxide condenses upon the interior surface of the lamp envelope thereby reducing lamp efficiency. The hydrogen present within the envelope of the lamp then reduces the oxide back to the metal freeing the oxygen to further corrode and remove more of the metal from the filament or electrode and further clouding the envelope by depositing the metal on the interior surface thereof. Thus, the lamp envelope becomes increasingly cloudy with a corresponding reduction in the efficiency of the lamp, and the metal filaments are deteriorated reducing the useful life of the lamps.

A very advantageous process and apparatus for the production of discrete particles of purified metal halides suitable for use in the production of metal halide lamps are disclosed in U.S. Pat. No. 3,676,534. As disclosed therein, a metal halide having oxygen-containing impurities is heated to a temperature above its melting point. The molten halide is purified, while at least a portion of the halide is molten, by passing therethrough at least one member selected from the group consisting of hydrogen halide, an admixture of hydrogen halide and hydrogen and an admixture of hydrogen and halogen, (the halogen, halogen radical of the hydrogen halide and the halogen radical of the metal halide being of the same halogen species) to convert at least a portion of the oxygen-containing impurities other than water present in the metal halide to water and volatile impurities and to remove at least a portion of the water and volatile impurities by scrubbing. The purified molten halide is then passed through a vibrating discharge conduit into an inert, quenching atmosphere (e.g., helium) to form particles of purified halide.

The process and apparatus of U.S. Pat. No. 3,676,534 is highly satisfactory for forming uniform pellets of metal halide salts of a relatively small size of for example, from about 200 to about 800 microns in diameter. Uniformity of size is important in accurate dosing of lamps, particularly if dosing is to be accomplished by machine operation. For the metal halides generally used in discharge lamps, particles of these sizes generally have a mass in the range of from about 0.02 to 2.0 milligrams per particle. Lamp fills usually range from about 6 to 30 milligrams per lamp.

While some lamp manufacturers prefer to use the relatively small size particles such as produced by U.S. Pat. No. 3,767,534 and secure the correct mass dosage by utilizing a measured volume of the particles, others prefer to dose with a larger pellet and its attendant lower surface area per gram. For example, if a manufacturer has lamps of three different wattages so that one lamp uses 11 milligrams of salt, another 22 milligrams of salt, and the third 33 milligrams of salt, these lamps could be dosed with 1, 2 and 3, respectively pellets of 11 milligrams mass.

However, it has been found that there are problems in forming pellets of about 3 milligrams or more in mass utilizing the process and apparatus of U.S. Pat. No. 3,676,534 since these relatively large sized particles possess too much heat of fusion to permit chilling quickly and the particles (which have a molten core) deform upon striking the bottom of the condensing chamber. Deformation of the particles into substantially flattened form decreases their utilization in commericial lamp-dosing operations. While the condenser section of the apparatus of U.S. Pat. No. 3,676,534 may be lengthened to permit further cooling of the particles and to thus alleviate the heat problem it has been found that for relatively high mass particles (e.g., 11 milligrams mass per particle), the condenser length for complete cooling of the particle is so great (e.g., equivalent to a 4 story building) as to be commercially impractical.

It has been proposed to form these relatively large-sized particles with apparatus similar to U.S. Pat. No. 3,676,534 but without a vibrating nozzle. Without vibration, the pellets drop from the discharge conduit nozzle essentially due to the hydrostatic head of the molten salt above the nozzle. The initial velocity of particles issuing from a vibrating discharge conduit is quite large while the initial velocity of pellets issuing from a non-vibrating or static discharge conduit is essentially zero. Due to the low initial velocity of pellets issuing from a static discharge conduit, the velocity of the particles through the condensation chamber is lower (thus increasing the time the particles are falling through the condensation chamber) and the final velocity of the particles at the time they reach the collection chamber is lower. Thus, particles formed from a static conduit have an increased opportunity to completely cool in the condensation chamber and a lessened tendency to become deformed upon collection.

It has further been found, however, that the molten salt may insufficiently wet the material (e.g., quartz) of the discharge conduit nozzle. If the molten salt insufficiently wets the discharge conduit nozzle, the resulting particles are quite non-uniform in size and mass. Wetting of the molten salt on the quartz discharge conduit nozzle appears to be at least partially dependent on the formation of hydrogen bonds between the oxygen of the quartz and an appropriate moiety (e.g., hydroxyl, sulfate and the like) in the molten salt. However, in the production of the ultrapure metal halide particles which have been treated to remove water, oxygen, hydrogen and any hydroxides or sulfates present, the purified molten salt is essentially devoid of the moieties necessary to effect such hydrogen bonding. It has been proposed to add a few parts per million of water to the inert quenching atmosphere which is then passed into contact with the molten salt to incorporate the water in the salt and thereby promote wetting of the molten salt. While this slight addition of water may promote wetting of the molten salt, the water also tends to react with the salt (and particularly if a lanthanide metal is a component of the molten salt) and form solid impurities which are insoluble in the salt and undesirable in the final product. Control of the amount of water necessary is also difficult and the use of too much water may lead to solid formations (e.g., scandium oxyiodide) which can clog the nozzle. The problems associated with water addition is particularly acute when the molten salt is or contains a lanthanide metal halide salt since the lanthanide metal halides form essentially insoluble salts with oxygen which interfere with the operation of the process and are detrimental impurities in the final salt product.

Accordingly, a primary object of the present invention is to provide a novel method for producing metal halides which prevent or alleviate the above discussed problems which occur in the production of metal halide lamps.

Another object of the present invention is to provide a novel method for producing relatively large sized metal halide particles containing a lathanide metal halide by passing a molten metal halide through a static discharge conduit wet by the molten halide.

Yet another object of the present invention is to provide a novel melthod for the increased wetting of molten lanthanide metal halide without substantially increasing the impurity content of the final solid lanthanide metal halide.

These and other aspects and advantages of the present invention will be readily apparent to one skilled in the art to which the invention pertains from the claims and from the following more detailed description of a preferred embodiment when read in conjunction with the appended drawings.

The FIGURE is a schematicrepresentation of the apparatus for producing discrete particles of purified metal halide.

DESCRIPTION OF THE PREFERRED EMBODIMENTS

The process of the present invention may be utilized in a process for forming particles of a lanthanide metal halide (or mixtures of lanthanide metal halides, particularly mixtures of lanthanide metal halides and alkali metal halides) in which the metal halide in molten form is passing through a discharge conduit into an inert, quenching atmosphere to form solid metal halide particles. As the term is used herein, "lanthanide metals" are scandium, yttrium and those metals of the lanthanide series having atomic numbers 57 through 71.

Referring to the FIGURE, a purificationvessel 10 has an upper section 12 for holding the metal halide 14 with an outlet 16 at the uppermost end thereof for the egress of various gases therefrom. The upper section 12 of the vessel means 10 is in axial, hermetically sealed, relationship with an intermediate section 18 which comprises a molten salt receiving and forming funnel 20 attached to vessel 10 by suitable means such as the retaining lips 22. The intermediate section 18 is hermetically sealed in axial relationship with a lower section 24 which comprises a gas inlet 26, a condensing chamber 28, and one or more collection vials 30. A conventional furnace 34 is shown schematically as the means for raising the temperature of the salt 14 above its melting point and for keeping it molten as it passes from the upper section 12 through the intermediate section 18 into the lower section 24 of the purification vessel 10. Brackets 19 may be affixed to the lower section 24 of the vessel 10 to hold the vessel 10 in an upright or vertical position. A fan 35 or other cooling means may be used to keep the condensing chamber 28 at a temperature below the melting point of the salt 14, so that the particles 120 may be quenched or solidified during their fall through the chamber 28 into the collection vial 30.

A cathetometer 36 or the like may be used to observe the molten halide to ensure that the molten halide is passing properly from the intermediate section 18 to the lower section 24 of the vessel 10.

Auxiliary apparatus includes a tank 40 containing hydrogen and a fluid passage comprising a valve 42, a reducing zone 44, a desiccant 46, a mercury colume release 47, and a valve 48. From that point, the hydrogen may be saturated with halogen gas and passed directly into the lower section 18 of the purification vessel 10 by means of a conduit 50, a bed 51 of halogen, e.g., iodine crystals, valves 52, 54, and 56, a conduit 58 and the inlet 26. Alternately, the hydrogen may be passed through a bed 60 of halogen, e.g., iodine crystals, and a reaction zone 62 with corresponding admission of the resulting reaction products to the purification vessel 10.

Inert gases such as argon and helium may be provided in tanks 64 and 66, respectively, and may be passed through a bed 68 of charcoal to absorb any hydrocarbon impurities, a desiccant 70, a bed 71 of reducing agent, e.g., titanium sponge at 850° C., to remove any remaining water and oxygen, and then through the valves 54 and 56 and the conduits 58 and 26 into the lower section 24 of the purification vessel 10.

The outlet 16 of the upper section 12 may be connected to a valve 72 through a line 74. A mercury column release valve 67 and valve 69 may be used to control pressure in the conduit between the tanks 64 and 66 and valve 54. The valve 72 may be connected to cold finger or trap 76 to condense water vapor and other condensable vapors, and the gas may then be passed through a valve 78 into bubblers 80 and then exhausted through a line 82. The valve 56 and the line 84 may be provided in fluid communication with the valve 72 such that inert gases from the tanks 64 and 66 may be passed through the line 74 and the conduit 16 into the upper section 12 of the purification vessel 10 to provide a positive pressure on the upper surface of the molten salt 14. A conventional pressure gauge 86 may be provided to monitor the pressure in the line 84.

The upper section 12 of the purification vessel 10 may have in its lower portion a silica frit, or a nickel or stainless steel filter 100 disposed immediately above a funnel or nozzle 102.

In operation, a reagent grade lanthanide metal halide 14 may be placed in the upper section 12 of the vessel 10 atop the filter 100 and the halide then outgassed to remove as much volatiles, e.g., free water, as possible. The outgassing, if necessary because of the volatile impurities trapped with the halide, may be conducted at temperatures from above about 50° C. and at atmospheric, superatmospheric or subatmospheric pressure, advantageously subatmospheric pressures of about $10^{-2}$ Torr (mm Hg) to $10^{-6}$ Torr, for a suitable time, e.g., about 16 to 48 hours, with the volatile gases being vented from the vessel 10 through the outlets 16 and 26.

Following the outgassing, hydrogen gas from the tank 40 may be flowed through a reducing zone 44 to remove any oxygen impurity therein. For example, the reducing zone 44 may comprise copper turnings maintained at a temperature of about 600° to 800° C., and preferably 650° to 700° C. The hydrogen gas may then be dried by passing it over a desiccant 46 such as magnesium perchlorate. The purified hydrogen gas may then be passed over a bed or zone of halogen 60 to charge or infuse the hydrogen with halogen of the same halogen species or molecular weight as the halogen radical of the lanthanide metal halide to be purified. For example, if scandium iodide is being purified, the hydrogen could be infused with iodine.

For example, the hydrogen may be charged with about 0.01 to 99.9 volume percent, preferably 1 to 50 volume percent, and most preferably about 20 to 30 volume percent iodine. For example, the hydrogen may be passed over or infused with iodine at a temperature between about 25° and 200° C., and preferably about 135° to 190° C.

In one embodiment, the mixture of hydrogen and halogen may then be passed directly to the purification vessel 10. Advantageously, the mixture may first be passed through a reaction zone to produce a hydrogen halide reaction product. For example, a mixture of hydrogen and iodine may be passed over a platinum catalyst at temperatures between 350° and 450° C., and preferably between 390° and 400° C., to form a resulting reaction mixture containing hydrogen iodide which may be present in a volume percent of from about 0.01 to 99.9, preferably, about 1 to 50 percent and most preferably about 20 to 30 percent.

If desired, hydrogen halides such as hydrogen iodide may be obtained directly from storage tanks or the like for use in the present invention instead of the above described reaction method.

The hydrogen and halogen or hydrogen halide gas mixture may then be passed through the halide or salt 14 by way of conduits 58 and 26 into the lower section 28 of the purification vessel 10 with sufficient pressure below the filter 100 to force the gas mixture up through the nozzle 102, through the salt 14, and then out of the upper section 12 of the purification vessel 10 through the outlet 16.

While the gas mixture is flowing through the salt 14, the temperature of the salt may be raised above the melting point, and preferably to 25° to 50° C. above the melting point of the salt, if the liquid temperature range of the salt will permit. During melting, the gas mixture removes any water by a scrubbing or stripping action, converts any hydroxides to the corresponding halides and water, and converts any sulfates to the corresponding halides, water and hydrogen sulfide. For example, when purifying reagent grade scandium iodide, the final oxygen content of the purified scandium iodide may be on the order of 20 to 5 parts per million, and advantageously is about 1 to 5 parts per million.

The molten salt may contain some dissolved water and dissolved gases which it is desirable to remove. The dissolved water and gases may be removed by evacuation of the molten salt to subatmospheric pressures, e.g., about $10^{-1}$ to $10^{-2}$ Torr, and then scrubbing the molten salt with an inert gas such as argon, nitrogen, or helium. For example, 3 to 20 evacuations with subsequent scrubbing, first with argon to remove hydrogen halide and other gases, and then with helium to remove hydrogen and other gases may be sufficient to remove substantially all of the dissolved gases in the molten salt. The evacuations may be accomplished by applying a partial differential vacuum to keep the molten salt on top of the silica frit, to the outlet 16 and the inlet 26 of the purification vessel 10, with scrubbing being accomplished by feeding the inert gases in through the inlet 26 and out through the outlet 16.

Following the above purification steps, the salt may be filtered and formed into precisely sized particles.

Customarily, reagent grade halides are prepared in carbonaceous solvents, and because of this, free carbon may be present in the salt. Further, there may be other impurities and insoluble oxide-containing particles and thus a suitable filter such as filter 100 may thus be provided in the funnel or nozzle 102 for removing these impurities.

Thereupon, an inert gas such as helium or hydrogen may be put into the condenser section 28 and into the upper section 12 above the molten salt 14 so that the salt is forced downwardly through the nozzle 102 in a drop wise fashion. The lanthanide metal salt flows from the upper section 12 into the receiving and forming funnel 32 which has nozzle 32 having a predetermined outside diameter. The outside diameter of the nozzle 32 and the surface tension (or wetting) coefficient ($\gamma$) between the lanthanide metal salt and the material of the nozzle (generally quartz) determine the mass of the pellets 120 issuing from the nozzle 20. The lanthanide metal salt flows out the nozzle 32 and up the outside of the funnel 20 until the gravitational force of the molten lanthanide metal salt exceeds the force of the surface tension tending to hold the lanthanide metal salt on the funnel. This mass may be expressed as:

$$Mg = 2\pi r \gamma \qquad (1)$$

where M is the mass of the lanthanide metal salt in grams, g is the acceleration of gravity, r is the outside radius of the nozzle where the drop releases and $\gamma$ is the surface tension between the lanthanide metal salt and the nozzle surface in dynes per centimeter. However, it has been found that the wetting ability of molten lanthanide metal halide salts is substantially reduced with respect to a quartz surface and the surface tension value $\gamma$ concomitantly substantially increased when the impurity level (and apparently particularly hydroxyl ion and sulfate ion content) of the molten lanthanide metal salt is substantially reduced. Thus, when the pure lanthanide metal salt is forced through the filter 102 and dropped into funnel 20, the lanthanide metal salt does not wet the funnel walls and builds up in the funnel until a hydrostatic head is built up sufficient to force the lanthanide metal salt through the nozzle in a jet stream. The pellets so formed are relatively small in size and have a non-uniform size distribution.

Although the addition of a few parts per million of water to a molten alkali metal halide salt (e.g., NaI) causes the liquid salt to wet the nozzle and form uniform particles of a mass which can be predicted according to the above equation, the presence of even such a minute amount of water in a melt containing a lanthanide metal halide (e.g., $ScI_3$ or a mixture of NaI and $ScI_3$) forms a compound (e.g., scandium oxyiodide) which is insoluble in the melt and which causes a plug to form in the funnel. Such a plug interferes with the production of uniformly sized pellets and can cause the funnel to become sufficiently clogged to prevent any pellet formation.

In the present invention, a hydrogen halide having the same halide radical as that of the lanthanide metal halide salt may be added to the lanthanide metal salt in an amount sufficient to promote the wetting of the lanthanide metal halide salt on the nozzle 32, which amount may be from about 3 to about 15, preferably from about 5 to about 10, p.p.m. of the hydrogen halide (based on the mass of the lanthanide metal salt). Additions of less than about 3 p.p.m. of the hydrogen halide are generally insufficient to effectively promote the wetting of the lanthanide metal salt while 15 p.p.m. is about the saturation point for the hydrogen halide in the molten lanthanide metal salt.

The hydrogen halide may be added in any manner in which it will contact and dissolve in molten lanthanide metal salt. Advantageously, the hydrogen halide may be added to the inert quenching atmosphere in the condensing section prior to forcing of the salt downwardly through nozzle 102 and the mixture is then passed up through the molten salt so that the hydrogen halide may dissolve in the molten lanthanide metal salt. The use of the hydrogen halide in this manner promotes the wetting of the molten metal salt at the nozzle 32 without substantially increasing the impurity content of the resulting metal halide particles. For example, with a molten salt mixture of sodium iodide and scandium iodide, a small amount of hydrogen iodide can be added to the inert atmopshere of the condensing chamber 28. The hydrogen iodide dissolves in the molten salt mixture and apparently forms a hydrogen iodoscandate coordination complex which causes the molten salt mixture to wet the silica nozzle 32 without the formation of insoluble or injurious oxyiodides. While not wishing to be bound by theroretical considerations, it is believed that the hydrogen of the hydrogen halide provides sufficient bonding between the halide of the lanthanide metal halide and the oxygen of the quartz nozzle material to promote the wetting thereof. When the salt pellet freezes in the condensing chamber 28, the hydrogen iodide is released from the pellet back into the inert atmosphere of the condensing chamber since its solubility in the solid salt is essentially zero. The resulting pellets are of uniform size and highly satisfactory for use in lamps.

With reference again to the FIGURE, the condensing chamber 28 should be of sufficient length, e.g., 6 inches to 6 feet, such that the liquid droplets will have time to solidify during their fall. Further, the condensing chamber is filled with an inert gas, preferably helium or hydrogen, containing the minor amount sufficient to promote wetting of the hydrogen halide, because of their desirable quenching characteristics and so as not to contaminate the purified particles. To aid in the quenching process, the inert gas may be at a temperature substantially lower than the melting point of the halide, e.g., the wall temperature of the quenching chamber may be about 0° to 50° C.

The resulting particles generally have a diameter in the range of from about 900 to about 3000, preferably from about 1000 to 2500, microns, and a mass of from about 6 to about 30, preferably from about 7 to about 24, milligrams per pellet. As disclosed in more detail in U.S. Pat. No. 3,676,534, these pellets are particularly useful in metal halide electric discharge lamps. The present invention is applicable also to mixtures of lanthanide metal halide salts and non-lanthanide metal halide salts, particularly where the non-lanthanide metal halide salt is an alkali metal halide salt and most particularly where the alkali metal halide salt content in the mixture is about 50 weight percent or more. When mixtures are utilized, the halide radicals of each of the metal halide salts should be of the same halogen species.

The invention is additionally illustrated in connection with the following Example which is to be considered asillustrative of the present invention. It should be understood, however, that the invention is not limited to the specific details of the Example.

EXAMPLE

A mixture of scandium triodide and sodium iodide was ultra-purified and made into uniformlly sized particles using the method of the present invention as described above.

A 745 gram mixture of 98 grams scandium triodide and 647 grams sodium iodide (both prepurified) was placed into the melt section of the vessel of the Figure. The mixture was outgassed overnight at 110° C. Thereafter, purified hydrogen gas having no readily measurable total impurity content was mixed with iodine vapor to form a gas mixture containing iodine in an amount of about 20 volume percent of the total gas mixture. This gas mixture was then passed over a platinum catalyst at 400° C. to form a resulting gaseous mixture containing 50 volume percent hydrogen iodide and 50 volume percent by hydrogen, which mixture was then passed into conduit 26, through the salt mixture 14 and out conduit 16 at a flow rate of 75 cc/min at an initial temperature of 110° C. and pressure of about 760 mm Hg. While the hydrogen/hydrogen iodide gas mixture was passing through the vessel, the temperature of the salt mixture, over a 30 to 45 minute period, was raised above its m.p. of 635° to 650° C., and maintained at that temperature for 15 to 20 minutes.

Any dissolved gases were then removed by evacuating atmosphere surrounding the molten salt mixture to $10^{-2}$ mm Hg for 2 minutes. The evacuation was following by a scrubbing procedure wherein pure inert gas was passed up through the molten salt at a flow rate of 75 cc/min for 2 minutes. This evacuation and scrubbing procedure was repeated 6 times with argon and with helium to ensure removal of virtually 100 percent of the dissolved gases and water in the molten salt mixture.

The molten salt mixture was filtered through a No. 3 porosity silica frit filter 100 and formed into precisely sized particles as follows. The condensing chamber 28 of the vessel was filled through conduit 26 with hydrogen at a pressure of 4.4 p.s.i. Argon was then introduced into the vessel through conduit 16 at a pressure to force the molten salt through the filter and the nozzle 102. The molten salt mixture came out of the nozzle as individual droplets which collected in receiving and forming funnel 20. The molten salt mixture did not wet the quartz funnel 20 and tended to build up in the funnel 20 until the hydrostatic head of salt was sufficient to force the salt out of the funnel. The salt issued from the funnel as a jet stream with random-sized relatively small particles.

The gas pressure above the molten salt mixture was relieved and 3 p.p.m. of hydrogen iodide (based on the weight of the molten lanthanide metal salt mixture) was added to the hydrogen in the condensing chamber 28. The pressure of this gaseous mixture was raised to force the gaseous mixture up through the molten salt mixture in the receiving funnel 20 and in upper melt section 12. After a few minutes, the pressure in the upper melt section 12 was again increased with argon to force the molten salt through nozzle 102 into the funnel 20. The molten salt mixture wetted the funnel 20 and pellets were formed which solidified during their fall in condenser section 24 and were collected as solid particles in collection vial 30. The pellets were uniform in size and had a mass of about 9.3 milligrams per pellet. (±0.5 mg).

The run was stopped and the hydrogen and hydrogen iodide removed by evacuation from the vessel. Thereafter, hydrogen was again introduced into the condensor section and 10 p.p.m. of hydrogen iodide (based on the weight of the molten lanthanide metal salt mixture) was added to the hydrogen. The gaseous mixture was passed through the molten salt mixture as described above. The resulting pellets were uniformly sized and had a mass of 11.95 milligrams per pellet (±0.5 milligram). The slightly higher amount of hydrogen iodide wetting agent apparently increased the wettability of the molten lanthanide metal salt to a more optimum level.

Analysis of the 9.3 milligrams pellets and the 11.95 milligrams pellets showed no discernible trace of hydrogen iodide. The resulting pellets were highly suitable for use in metal discharge lamps.

All parts, percentages and ratios used throughout the specification and claims are by weight unless otherwise indicated.

The method of determining the total oxygen content of the halides is the technique of activation analysis which uses radioactive nuclei counts. See *Analytical Chemistry*, Vol. 36, February, 1964, page 2871; and Vol. 38, June 1966, page 947.

The Periodic Table referred to herein is the Mendeleev Periodic Table of the Elements appearing in *Organic Chemistry*, R. T. Morrison et al., Allyn and Bacon, Inc., Boston (1959).

The principles, preferred embodiments, and modes of operation of the present invention have been described in the foregoing specification. The invention which is intended to be protected herein, however, is not to be construed as limited to the particular forms disclosed, since there are to be regarded as illustrative rather than restrictive. Variations and changes may be made by those skilled in the art without departing from the spirit of the present invention.

What is claimed:

1. In a process in which a purified lanthanide metal halide salt is melted and passed through a discharge conduit into an inert, quenching atmosphere of sufficient length and temperature to at least partially solidify particles containing purified lanthanide metal halide, the improvement which comprises promoting wetting of the lanthanide metal halide salt on the conduit without the addition of water to the quenching atmosphere, said promoting of wetting being effected by adding to said molten lanthanide metal halide a controlled amount of hydrogen halide effective to promote wetting of the lanthanide metal halide salt on the conduit during the discharge into the inert quenching atmosphere, the halide radical of the lanthanide metal salt and the halide radical of the hydrogen halide being of the same halogen species.

2. In the process of claim 1, wherein the hydrogen halide is added to the quenching atmosphere in an amount of from about 3 to about 15 p.p.m based on the total mass of the lanthanide metal halide.

3. In the process of claim 2, wherein the hydrogen halide is added to the quenching atmosphere in an amount of from about 5 to about 10 p.p.m.

4. In the process of claim 1, wherein the halide is iodide.

5. In the process of claim 4, wherein the lanthanide metal is scandium.

6. A method of forming substantially uniformly sized particles comprising a lanthanide metal halide salt having a mass greater than about 3 milligrams per particle comprising forming a melt comprising a purified lanthanide metal halide salt discharging the molten purified lanthanide metal halide salt through a conduit as particles of substantially uniform size into a quenching chamber having an inert atmosphere, the chamber having a temperature and length sufficient to substantially solidify said particles, said discharging being performed in the presence of a minor amount of wetting agent effective to promote the wetting of the molten lanthanide metal salt on the conduit, to facilitate formation of particles having a mass greater than about 3 milligrams per particle said minor amount of said wetting agent being essentially soluble in the molten lanthanide metal halide salt and substantially insoluble in said solidified lanthanide metal salt particles.

7. The method of claim 6 wherein said wetting agent is a hydrogen halide, the halide radical of the lanthanide metal halide salt and the halide radical of the hydrogen halide being of the same halogen species.

8. The method of claim 7 wherein the halogen species is iodine.

9. The method of claim 8 wherein the lanthanide metal is scandium.

10. The method of claim 6 wherein said melt also includes a halide salt of a non-lanthanide metal, the halide radical of the non-lanthanide metal halide salt being of the same halogen species as the halide radical of the lanthanide metal halide salt.

11. The method of claim 10 wherein the non-lanthanide metal is sodium.

12. The method of claim 11 wherein the lanthanide metal is scandium.

13. The method of claim 7 wherein said hydrogen halide wetting agent is present in an amount of from about 3 to about 15 parts per million based on the weight of the lanthanide metal halide salt.

14. The method of claim 13 wherein said hydrogen halide wetting agent is present in an amount of from about 5 to about 10 parts per million based on the weight of the lanthanide metal halide salt.

15. The method of claim 6 wherein the wetting agent is mixed with an inert gas and the mixture is passed into contact with the melt prior to discharge of the melt through the conduit.

16. A method of forming substantially uniform sized particles containing a lanthanide metal halide salt, said particles having a mass greater than about 3 milligrams comprising the steps of:
(a) forming a melt containing a purified lanthanide metal halide salt;
(b) discharging the molten metal halide salt through the conduit into a chamber having an inert quenching atmosphere to form pellets of substantially uniform size, the chamber having a temperature and a length sufficient to substantially solidify said pellets sufficient to resist deformation upon collection in the quenching chamber; and, (c) contacting the discharge conduit and the molten metal halide salt with an amount of a substance effective to wet the molten metal halide salt on the conduit to facilitate formation of droplets of the molten metal halide salt having a mass greater than about 3 milligrams per particle, without reacting with the molten metal halide salt to form insoluble impurities therein.

17. The method of claim 16 wherein said substance is a hydrogen halide, the halide radical of the lanthanide metal halide salt and the halide radical of the hydrogen halide being of the same halogen species, present in an amount of from about 3 to about 15 parts per million based on the amount of the lanthanide metal halide salt.

18. The method of claim 17 wherein the melt is formed of a mixture of a lanthanide metal halide salt and an alkali metal halide salt.

19. The method of claim 18 wherein the lanthanide metal halide salt is scandium iodide, the alkali metal halide salt is sodium iodide, the hydrogen halide is hydrogen iodide and the hydrogen iodide is present in an amount of from about 5 to 10 parts per million.

* * * * *